(12) United States Patent
Patarra

(10) Patent No.: US 6,554,012 B2
(45) Date of Patent: Apr. 29, 2003

(54) PORTABLE COOLER APPARATUS WITH UMBRELLA MOUNTING MEANS

(76) Inventor: Samuel F. Patarra, 111 Elysium Dr., Royal Palm Beach, FL (US) 33441

( * ) Notice: Subject to any disclaimer, the term of this patent is extended or adjusted under 35 U.S.C. 154(b) by 0 days.

(21) Appl. No.: 09/917,551

(22) Filed: Jul. 30, 2001

(65) Prior Publication Data

US 2001/0054433 A1 Dec. 27, 2001

Related U.S. Application Data

(63) Continuation-in-part of application No. 09/317,301, filed on May 24, 1999, now Pat. No. 6,199,570, which is a continuation-in-part of application No. 09/726,189, filed on Nov. 29, 2000, and a continuation-in-part of application No. 09/823,178, filed on Apr. 20, 2001.

(51) Int. Cl.$^7$ .............................. A45B 3/00; B62B 3/02
(52) U.S. Cl. ........................... 135/16; 62/331; 62/457.7
(58) Field of Search ..................... 135/16; 62/457.7, 62/331; 206/216, 427; 220/592.03; 52/165; 248/530, 519, 523, 524, 156, 158, 910

(56) References Cited

U.S. PATENT DOCUMENTS

| | | | | |
|---|---|---|---|---|
| 585,486 A | * | 6/1897 | Snow | |
| 892,813 A | | 7/1908 | Dolles | |
| 2,190,222 A | * | 2/1940 | Strasser | |
| 3,167,292 A | * | 1/1965 | Meyerowitz | |
| 3,624,732 A | * | 11/1971 | Bowden | 108/151 |
| 3,823,785 A | * | 7/1974 | Toliver | 173/90 |
| 4,296,693 A | * | 10/1981 | Archer | 108/28 |
| 4,664,041 A | * | 5/1987 | Wood | 109/51 |
| 4,832,163 A | | 5/1989 | Levesque | |
| 4,850,564 A | * | 7/1989 | Padlin | 248/533 |
| 4,920,897 A | * | 5/1990 | Reed et al. | 108/150 |
| 5,100,198 A | * | 3/1992 | Baltzell | 297/192 |
| 5,143,108 A | | 9/1992 | Kenny | |
| 5,161,561 A | * | 11/1992 | Jamieson | 135/16 |
| 5,169,111 A | * | 12/1992 | Dunaj | 248/523 |
| 5,199,361 A | * | 4/1993 | Robinson | 109/51 |
| 5,207,406 A | * | 5/1993 | Stine et al. | 248/514 |
| 5,259,215 A | | 11/1993 | Rocca | |
| 5,269,157 A | | 12/1993 | Ciminelli et al. | |
| 5,271,196 A | * | 12/1993 | Fanti | 52/166 |
| 5,275,018 A | | 1/1994 | Lin et al. | |
| 5,373,708 A | | 12/1994 | Dumoulin, Jr. | |
| 5,407,218 A | | 4/1995 | Jackson | |
| 5,427,346 A | * | 6/1995 | Urgola | 248/519 |
| 5,480,170 A | * | 1/1996 | Kaiser | 280/30 |
| 5,535,978 A | * | 7/1996 | Rodriguez et al. | 248/530 |
| D378,456 S | * | 3/1997 | Speicher | D34/25 |
| 5,636,852 A | * | 6/1997 | Sistrunk et al. | 280/30 |
| 5,819,720 A | * | 10/1998 | Schubert | |
| 5,823,213 A | | 10/1998 | Patarra | |
| 5,876,047 A | * | 3/1999 | Dennis | 580/47.35 |
| 5,979,793 A | * | 11/1999 | Louis | |
| 6,199,569 B1 | | 3/2001 | Gibson | |
| 6,199,570 B1 | | 3/2001 | Patarra | |
| 6,216,488 B1 | | 4/2001 | Rucker | |
| 6,374,839 B2 | * | 4/2002 | Patarra | 135/16 |

FOREIGN PATENT DOCUMENTS

| | | |
|---|---|---|
| FR | 2 606 063 | 6/1988 |
| FR | 2 678 977 | 1/1993 |

\* cited by examiner

*Primary Examiner*—Robert Canfield
(74) *Attorney, Agent, or Firm*—Oltman, Flynn & Kubler

(57) ABSTRACT

A container apparatus for use in combination with an umbrella having an umbrella mast and umbrella canopy includes a food container having a container top wall, a container side wall and a container bottom wall together defining a container interior, with an umbrella mast passing port, a mast engaging structure, and a container interior access door; so that the umbrella mast of may be inserted into the mast passing port and advanced into the interior of the container and engaged by the mast engaging structure, thereby holding the umbrella mast upright relative to the container and so that the container stabilizes the umbrella, which can be opened over the container.

16 Claims, 7 Drawing Sheets

PORTABLE COOLER APPARATUS WITH UMBRELLA MOUNTING MEANS

FILING HISTORY

This application is a continuation-in-part of application Ser. No. 09/317,301 filed on May 24, 1999 now 6,199,570, a continuation-in-part of application Ser. No. 09/726,189 filed on Nov. 29, 2000, and a continuation-in-part of application Ser. No. 09/823,178 filed Apr. 20, 2001.

BACKGROUND OF THE INVENTION

1. Field of the Invention:

The present invention relates generally to the field of heat insulated food containers commonly known as coolers. More specifically the present invention relates to a portable cooler apparatus which serves as a base for supporting an upright beach umbrella. The portable cooler apparatus includes a food container which is preferably insulated against heat transfer with the surrounding environment, the container having a container top wall, a container side wall and a container bottom wall preferably formed integrally with the container side wall, the container top wall having an umbrella mast passing port and the container bottom wall having mast engaging means, such that the mast of an umbrella can be inserted into the mast passing port and advanced into the container interior and engaged by the mast engaging means, thereby holding the umbrella upright relative to the container, and two opposing container interior access container lids. The food container optionally contains a partition wall dividing the interior of the container into two regions which can be accessed separately from corresponding interior access container lids. The partition wall serves to segregate food items or to keep one region cool while the other region is frequently opened. The container acts as a stabilizing base for the umbrella, which can be opened over the container, and the container top wall preferably functions as a table on which the user can place food and drink items for consumption. The mast of the umbrella is removably fitted into the top of the container, and preferably extends into a mast receiving tube secured within and extending above the container. An adjustable table structure is optionally provided which includes a table port through which the mast receiving tube passes. The table structure support element releasibly engages the mast receiving tube at any selected elevation to hold the table structure at a convenient height. A pull handle is preferably provided on the container side wall and a pair of wheels are preferably secured to the lower end of the container side wall opposite the pull handle so that the container can be pulled conveniently to its destination. A ground anchoring pointer is optionally removably secured to extend downwardly from the container.

2. Description of the Prior Art:

There previously have been beach umbrellas having umbrella masts structurally combined with various containers. Patarra, U.S. Pat. No. 5,823,213, issued on Oct. 20, 1998 discloses a combination purse and umbrella in which the umbrella canopy collapses around a purse container at the base of the umbrella mast. Kenney, U.S. Pat. No. 5,143,108, issued on Sep. 1, 1992 teaches a beach umbrella having secured to its mast several rotatable utility compartments for storing beach equipment and having a base end stake for penetrating the ground. Dolles, U.S. Pat. No. 892,813, issued on Jul. 7, 1908 reveals a folding umbrella in which the handle at the base of the mast is tubular and serves as a receptacle for the folded body of the umbrella. Levesque, U.S. Pat. No. 4,832,163, issued on May 23, 1989, discloses a portable table system including a pair of semi-cylindrical containers secured face to face to define a complete cylinder which receives the mast of an umbrella and the upper surface of which functions as a table top. French patent number 91 09008/2 678 977 filed on Jul. 10, 1991 by Guetta teaches a portable container which may be insulated, and having a vertical tubular member securely attached to and passing at least partly through the container for receiving the lower end of an umbrella mast. French patent 86 15303/2 606 063 filed on Oct. 31, 1986 by Rombi reveals a sunshade supporting water container made up of two semicircular container halves hinged together along their lateral edges, each having a central longitudinal channel, for placing face to face to receive in the opposing channels the mast of an umbrella. Problems with all of these prior devices include that they do not provide a unified umbrella and ground piercing pointer which is removable from the container, do not provide food supporting table surfaces of selectable height and do not provide wheel and handle transport means.

It is thus an object of the present invention to provide a container apparatus which is designed to receive and hold upright the mast of an umbrella such as a beach umbrella to form a composite apparatus which can be disassembled to become sufficiently compact to fit easily into the trunk of an automobile.

It is another object of the present invention to provide such an apparatus which includes a food supporting table structure of adjustable height for retaining food items retrieved from within the container at an elevation for easy access depending, for example, on the height of the user chair.

It is still another object of the present invention to provide such an apparatus in which the container is heat insulated to function as a cooler for food items and the container upper wall functions as a table for placement of the food items during consumption of the food items.

It is yet another object of the present invention to provide such an apparatus which is readily portable without lifting, including a pull handle and wheels, and from which the umbrella can be quickly and easily removed without tools.

It is finally an object of the present invention to provide such an apparatus which is simple in design, durable, easy to use and relatively inexpensive to manufacture.

SUMMARY OF THE INVENTION

The present invention accomplishes the above-stated objectives, as well as others, as may be determined by a fair reading and interpretation of the entire specification.

A container apparatus is provided for use in combination with an umbrella having an umbrella mast and umbrella canopy, including a food container having a container top wall, a container side wall and a container bottom wall together defining a container interior, with an umbrella mast passing port, a mast engaging structure, and a container interior access door; so that the umbrella mast may be inserted into the mast passing port and advanced into the interior of the container and engaged by the mast engaging structure, thereby holding the umbrella mast upright relative to the container and so that the container stabilizes the umbrella, which can be opened over the container.

The container preferably is insulated against heat transfer between the container interior and the surrounding environment. The container bottom wall preferably is integral with the container side wall. The container top wall preferably is substantially horizontal when the container is upright and thereby functions as a table upon which a user can place food and drink items. The apparatus preferably additionally includes a pull handle on the container and at least one wheel rotatably mounted onto the container substantially opposite the pull handle so that the container wheel rolls on the ground as the pull handle is pulled by a user. The container may be a substantially rectangular box.

The mast engaging structure preferably includes a mast securing fitting connected to the container bottom wall which includes an annular flange having an upright tubular segment for receiving the lower end of the umbrella mast. The apparatus preferably additionally includes a mast retaining tube extending from the mast engaging structure to the mast passing port in the container top wall.

The apparatus preferably still further includes a container stabilizing mechanism for keeping the umbrella from overbalancing the container and causing the container to tip over when the apparatus rests on a granular surface. The stabilizing mechanism preferably includes a pointer removably secured to the lower end of the umbrella mast; and a pointer passing port in the container bottom wall for passing the pointer completely through the a container so that the pointer projects downwardly out of the container bottom wall and into the granular surface. The apparatus preferably additionally includes a depth marking line on the umbrella mast for indicating a suggested pointer insertion depth when the depth marking line registers with another part of the apparatus.

The pointer preferably includes a shaft having substantially the same diameter as the umbrella mast and has a pointer lower end which is tapered for lower resistance penetration into the ground. The pointer has a pointer upper end, and the pointer upper end preferably has an upwardly protruding, axial, externally threaded pointer bolt portion having a smaller diameter than the diameter of the umbrella mast; and the mast lower end has an internally threaded axial mast bore for threadedly receiving the pointer bolt portion to removably connect the pointer to the umbrella mast. The apparatus preferably still further includes a port closing door underneath the pointer passing port, such that the pointer passing port can be closed to prevent mast passage.

The container top wall preferably includes a top wall fixed section secured to the container side wall and includes the mast passing port. Wherein the top wall fixed section preferably includes an elongate diametric strip passing over the middle of the container and connected to the container side wall at opposing points of the container side wall, the apparatus preferably additionally includes a container lid defining the remainder of the container top wall and closing the container. Where the top wall fixed section is a diametric strip, the first and second container lids are pivotally secured to opposing sides of the top wall fixed section with hinges and extend from the top wall fixed section in opposite directions to meet upper end segments of the container side wall, thereby completing the container top wall and closing the container.

A container and umbrella apparatus is provided, including an umbrella having an umbrella mast and umbrella canopy; a food container having a container top wall, a container side wall and a container bottom wall together defining a container interior, with an umbrella mast passing port mast engaging structure, and a container interior access door; so that the umbrella mast may be inserted into the mast passing port and advanced into the interior of the container and engaged by the mast engaging structure, thereby holding the umbrella mast upright relative to the container and so that the container stabilizes the umbrella, which can be opened over the container.

The umbrella mast preferably includes a mast upper segment; and a mast lower segment separate from the mast upper segment, the mast lower segment being tubular and sized so that the mast upper segment telescopingly fits into the mast lower segment to produce any of a variety of overall mast heights as desired by the individual user; a cam lever locking mechanism for releasibly locking the mast upper segment against movement relative to the mast lower segment at the desired telescoping position.

The upper end of the mast lower segment preferably includes a cam lever opening and the cam lever locking mechanism preferably includes a cam lever having an elongate lever end for gripping and moving by hand and having a cam end perforated by a fulcrum pin port and which fits into the cam lever opening in the mast lower segment and includes a cam lever pin passing through the mast lower segment upper end, through the cam lever opening and through the fulcrum pin port in the cam lever, so that the cam lever pivots within the cam lever opening and the cam end progressively protrudes into the interior of the mast lower segment to varying degrees as the cam lever is pivoted and thus progressively bears against and grips the mast upper segment.

The container preferably additionally includes at least one container partition wall dividing the interior of the container into at least two interior regions. The apparatus preferably additionally includes an adjustable table structure having a central table structure port through which the mast passes; and releasable mast engaging means. The mast has a mast lower end and preferably has an internally threaded mast axial bore at the mast lower end, and the mast engaging mechanism preferably includes a mast securing fitting connected to the container bottom wall which includes an annular flange having an externally threaded upright tubular segment for screwing into the internally threaded mast axial bore. The apparatus preferably additionally includes a mast retaining tube extending around and upwardly from the mast engaging mechanism at least to the mast passing port in the container top wall.

The stabilizing structure preferably includes a pointer having a penetrating pointer lower end and having an engaging pointer upper end removably secured to the mast; and a pointer passing port in the container bottom wall for passing the pointer engaging end so that the pointer projects downwardly out of the container bottom wall and into the granular support surface. The pointer preferably includes a shaft and the penetrating pointer lower end is tapered for minimized penetration resistance into the granular support surface.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
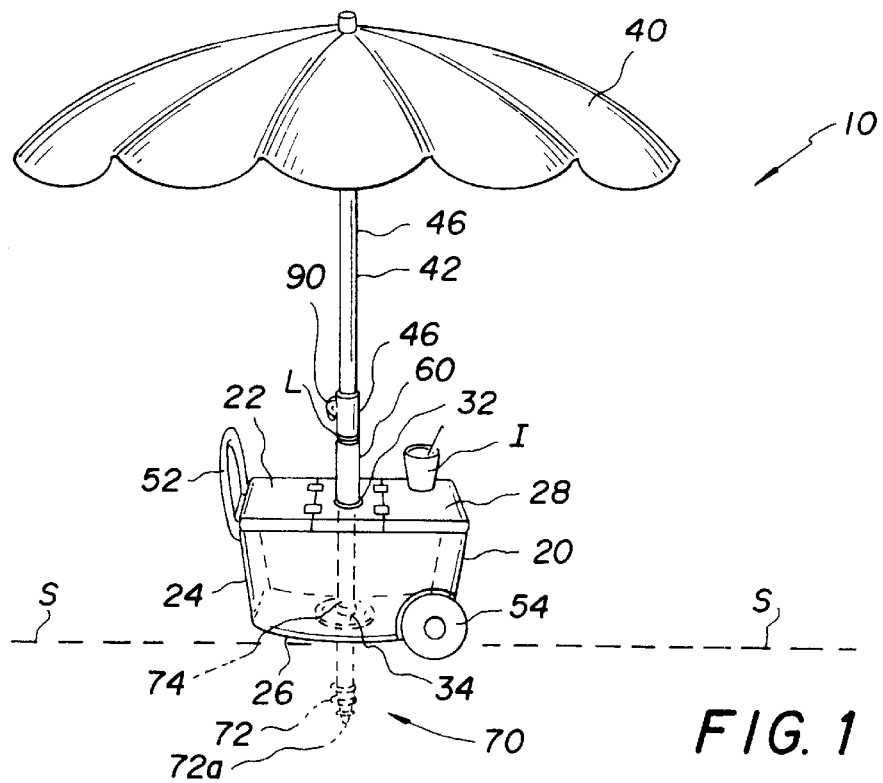
FIG. 1 is a perspective view of the preferred embodiment of the apparatus, shown with the umbrella canopy open, and revealing in broken lines the interior of the container and the pointer protruding downwardly into a granular support surface. A beverage glass is shown on top of the container top wall.
Figure 2:
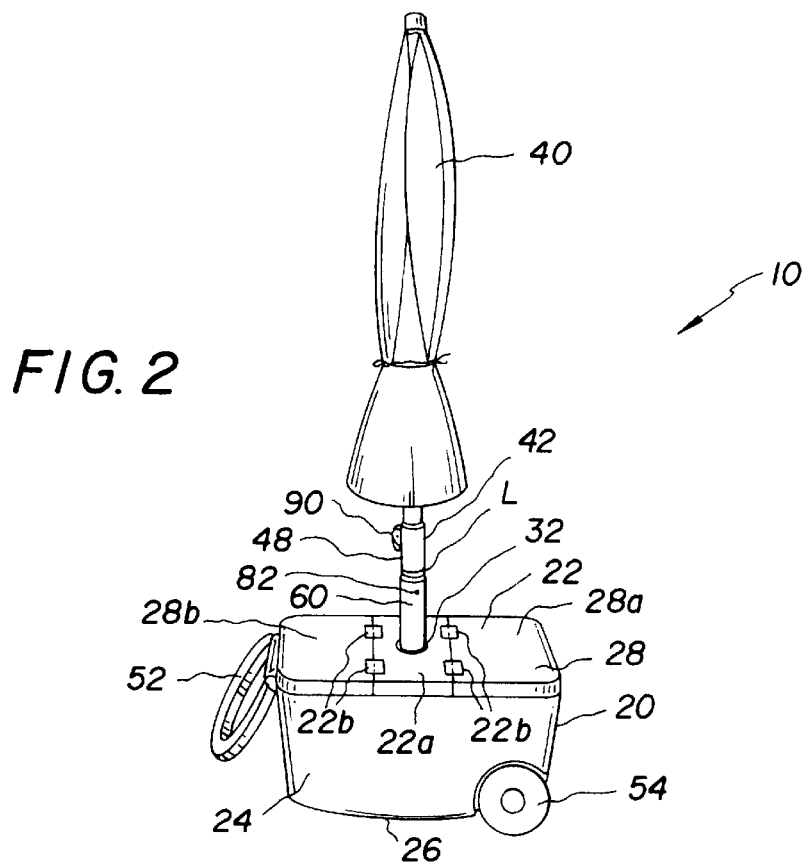
FIG. 2 is a view generally as in FIG. 1 with the umbrella canopy closed and the pointer omitted.
Figure 3:
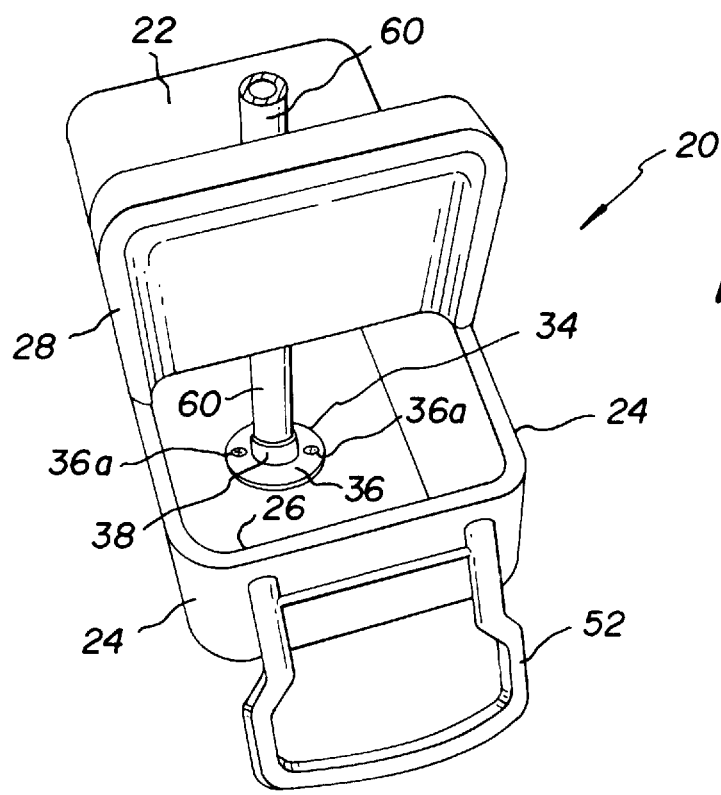
FIG. 3 is a top perspective view of the apparatus container with one of the two opposing lids open, revealing the lower segment of the mast retaining tube and the mast engaging means.
Figure 4:
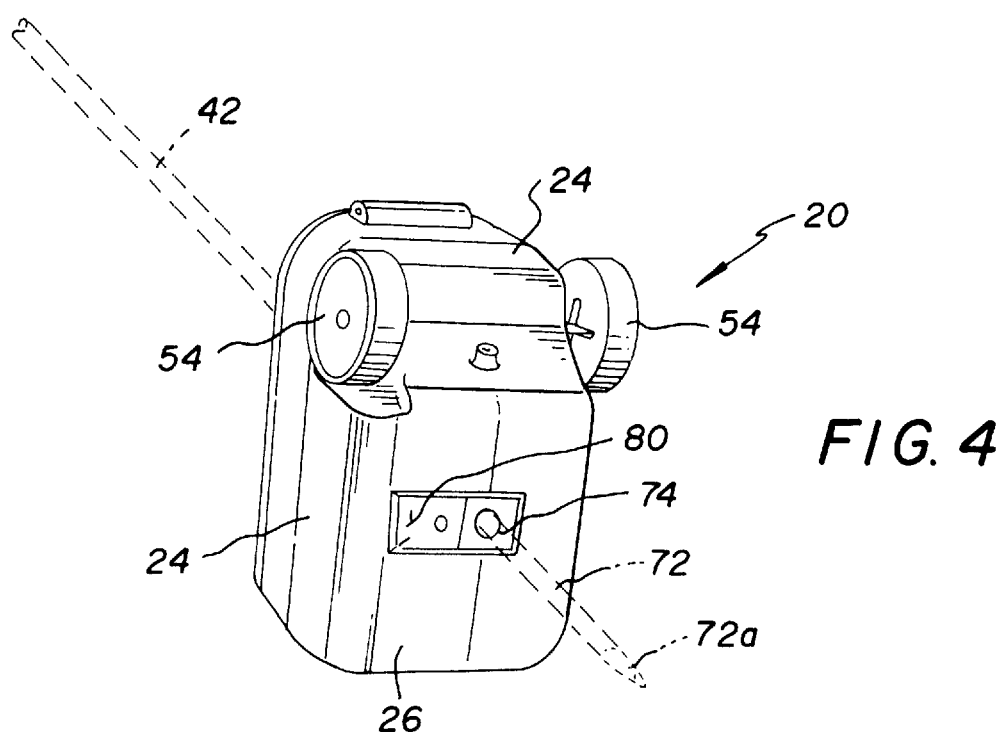
FIG. 4 is a bottom perspective view of the apparatus container, showing the mast passing port in the container bottom wall with a one piece mast shown in broken lines passing through the container and the pointer portion extending out of the bottom of the container through the mast passing port. An interior access door or container lid is shown in its open position adjacent the mast passing port which is slidable on parallel tracks.
Figure 5:
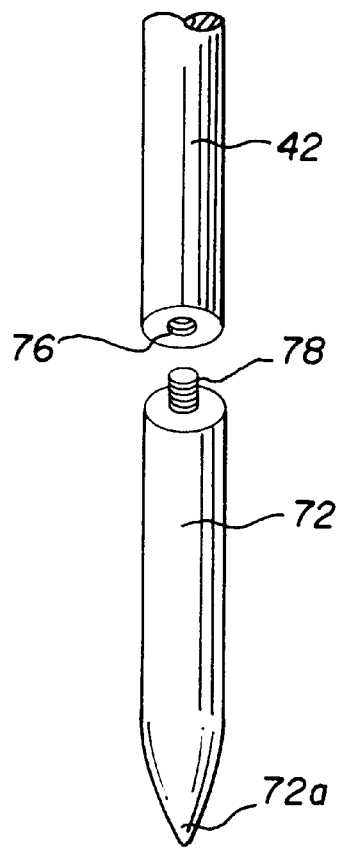
FIG. 5 is a broken away perspective view of the pointer and the mast lower segment lower end, showing the externally threaded pointer bolt portion positioned for engaging insertion into the internally threaded axial mast bore.
Figure 6:
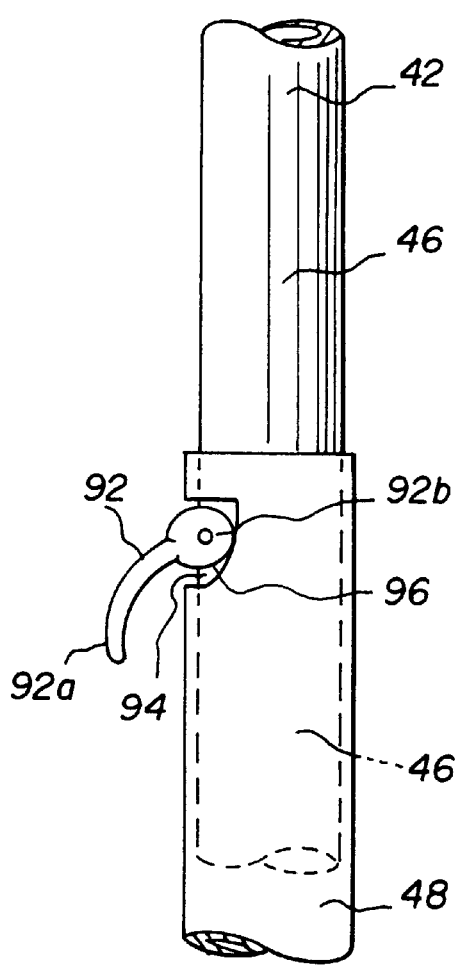
FIG. 6 is a broken away side view of telescoping upper and lower mast segments, and of the cam lever locking mechanism, showing details of the cam lever as its cam end bears against and engages the mast upper segment.
Figure 7:
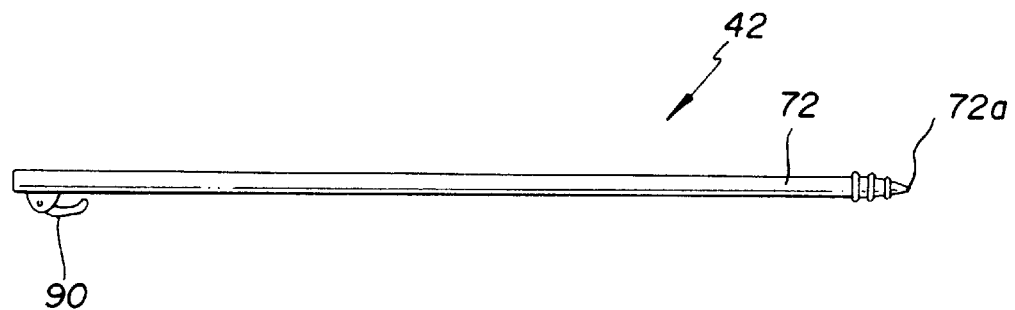
FIG. 7 is a side view of an optional unified mast and pointer combination for substitution for a mast without a pointer when placing the apparatus on a granular surface.
Figure 8:
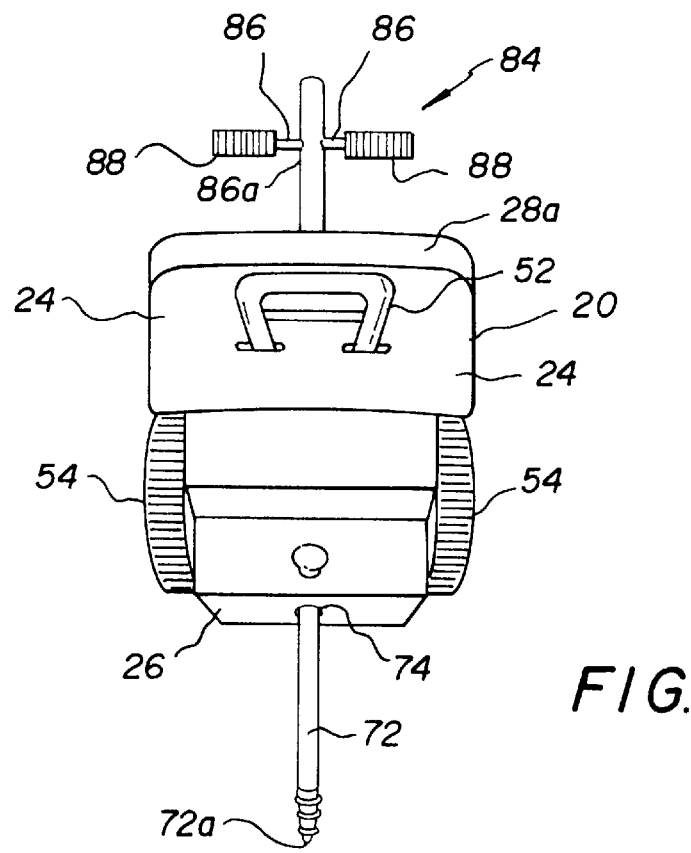
FIG. 8 is an end view of the food container showing the unified mast and pointer of FIG. 7 with the optional pointer rotating handle passing fitted through the handle pin port with the second handle grip positioned for fitting onto the protruding end of the handle pin, so that the handle can be gripped with two hands to rotate the mast and pointer to burrow the pointer in the ground.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–8, a cooler apparatus 10 is disclosed including a food container 20 which is preferably insulated against heat transfer with the surrounding environment, the container 20 having a container top wall 22, a container side wall 24 and a container bottom wall 26 preferably formed integrally with container side wall 24, the container top wall 22 having an umbrella mast passing port 32 and the container bottom wall 26 having mast engaging means 34, such that the mast 42 of an umbrella 40 can be inserted into the mast passing port 32 and advanced into the container 20 interior and engaged by the mast engaging means 34, thereby holding the umbrella 40 upright relative to the container 20, and the container 20 further having a container interior access door or container lid 28. Container 20 acts as a stabilizing base for the umbrella 40, which can be opened over container 20, and the container top wall 22 preferably functions as a table on which the user can place food and drink items I for consumption.

A pull handle 52 is preferably provided on the container side wall 24 and a pair of wheels 54 are preferably secured to the lower end of the container side wall 24 opposite the pull handle 52 so that the container 20 can be pulled conveniently to its destination. An example of a suitable container 20 is a wheeled cooler made by COLEMAN™. Container 20 may be a rectangular box, or may take any other suitable configuration such as circular, square or elliptical. The optional container 20 insulation may be provided by a conventional double wall containing an air gap, or by fabrication from an insulating foam.

The mast engaging means 34 preferably includes a mast securing fitting in the form of an annular flange 36 having an upright tubular segment 38 for receiving the mast 42. See FIG. 3. Screw 20 fasteners 36a preferably pass through annular flange 36 and into the container bottom wall 26. It is preferred that a mast retaining tube 60 be secured to and extend from the mast engaging means 34 through the mast passing port 32 in the container top wall 22, and protrude a certain distance above container top wall 22.

Stabilizing means 70 are added to keep the umbrella 40 from overbalancing the apparatus 10 and tipping it over on a sand or soil surface S. Stabilizing means 70 include a spike or pointer 72 which is removably secured to the mast 42 lower end, and a pointer passing port 74 in the container bottom wall 26 at the location of the mast engaging means 34 for passing the pointer 72 completely through container 20 so that pointer 72 projects downwardly and out of the container bottom wall 26 and into the sand or soil. A pointer rotating handle 84 is provided which includes a handle pin 86 projecting from a handle grip 88, and a handle pin port 86a through mast 42 through which handle pin 86 is removably fitted so that handle grip 88 projects. See FIG. 8. A second handle grip 88 is preferably removably fitted over the end of handle pin 86 protruding through mast 42. Then both handle grips 88 are gripped by user hands and are used as levers to rotate mast 42 so that pointer rotates and burrows into a granular surface beneath apparatus 10. A thumb set screw 82 is preferably screwed radially into and through a threaded retaining tube 60 set screw port to either abut and frictionally engage the umbrella mast 42 or to screw into a registering, threaded umbrella mast 42 port to releasibly retain the umbrella mast 42 within retaining tube 60. A depth marking line L is provided on the mast 42 which indicates the optimum pointer 72 insertion depth when the depth marking line L registers with the upper edge of the mast retaining tube 60, or where tube 60 is omitted, with the upper edge of the mast passing port 32 in the container top wall 22. When the depth marking line L thus registers, the pointer 72 is fully inserted into the ground. The pointer 72 preferably is a shaft having the same diameter as the umbrella mast 42 and has a pointed lower end 72a. The pointer 72 upper end has an upwardly protruding, axial, externally threaded pointer bolt portion 78 of smaller diameter than the mast 42 at the pointer 72 upper end, and the mast 42 lower end has an internally threaded axial mast bore 76 to threadedly receive the pointer bolt portion 78 to removably connect the pointer 72 to the mast 42. A port closing door 80 is preferably provided underneath the pointer passing port 74, so that the pointer passing port 74 can be closed to prevent mast 40 passage.

The umbrella 40 may be of conventional construction, and may be purchased separately from the apparatus 10 from an existing line of outdoor or beach umbrellas. Alternatively, the umbrella 40 may be of the general design disclosed in U.S. Pat. No. 5,823,213 issued on Oct. 20, 1998 to the present applicant.

The umbrella mast 42 optionally includes a mast upper segment 46 and a separate mast lower segment 48, which are tubular and sized so that the mast upper segment 46 telescopingly fits into the mast lower segment 48 to any of a variety of overall mast 42 lengths heights as desired by the individual user and as dictated by the circumstances of the given use. A cam lever locking mechanism 90 is preferably provided to releasibly lock the mast upper segment 46 against movement relative to the mast lower segment 48 at any desired telescoping position. See FIG. 6. Cam lever locking mechanism 90 includes a cam lever 92 has an elongate lever end 92a for gripping and moving by hand and has a cam end 92b perforated by a fulcrum pin port and which fits into a cam lever opening 94 in the mast lower segment upper end. A cam lever pin 96 passes through the mast lower segment 48 upper end, through the cam lever opening 94 and through the aligned fulcrum pin port in the cam end 92b, so that the cam lever 92 pivots within the cam lever opening 94 and the cam end 92b progressively protrudes into the interior of the mast lower segment 48 to varying degrees as the cam lever 92 is pivoted. The mast upper segment 46 is fitted into the mast lower segment 48 when the cam lever 92 is pivoted to a position at which the cam end 92b protrudes either not at all or minimally into the mast lower segment 48 interior, and when the mast upper segment 46 is telescoped to its desired position relative to the mast lower segment 48, the cam lever 92 is pivoted to protrude progressively further into the mast lower segment 48 interior to abut the mast upper segment 46 with progressive force until a firm friction engagement with the mast upper segment 46 is achieved. The mast upper segment 46 is subsequently released by pivoting the cam lever 92 in the opposite direction.

Pointer 72 is described above as a detachable element from mast 42. Yet it is also contemplated that pointer 72 may be an integral part of umbrella mast 42. Where umbrella mast 42 has a detachable upper and lower mast segments 46 and 48, a lower mast segment 48 having no pointer 72 portion is provided for use on solid surfaces and a second lower mast segment 48 having an integral pointer 72 is provided for use on granular support surfaces. See FIG. 4. Still alternatively, mast 42 may be provided as a single integral piece including pointer 72.

The container top wall 22 preferably includes a top wall fixed section 22a secured to the container side wall 24 includes the mast passing port 32. The top wall fixed section 22a is preferably an elongate diametric strip passing over the middle of container 20 and secured to or integrally formed with the container side wall 24 at opposing points of the side wall 24. Container lid 28 forms the remainder of the container top wall 22 and closes the container 20.

Where the fixed section 22a is a diametric strip, first and second container lids 28a and 28b, respectively, are pivotally secured to opposing sides of the fixed section 22a with hinges 22b and extend from fixed section 22a in opposite directions to meet side wall 24, thereby completing container top wall 22 and closing container 20.

Method

When apparatus 10 is to be used on a hard or paved surface, the port closing door 80 is closed and the pointer 72 is removed from the mast 42. Then the mast 42 is fitted through the mast passing port 74 and into the mast engaging means 34, so that the mast 42 lower end abuts and is supported by port closing door 80. When apparatus 10 is to be used on a sand or soil surface S, the port closing door 80 is preferably opened and the pointer 72 attached to the mast 42, as described. When container 20 is in its desired location for use, the combined pointer 72 and mast 42 are slid downwardly through the mast passing port 32 and the pointer 72 is slid further downwardly through the pointer passing port 74 and into the ground until the depth marking line L registers with the upper edge of the mast passing port 32.

Second Preferred Embodiment

Figure 11:
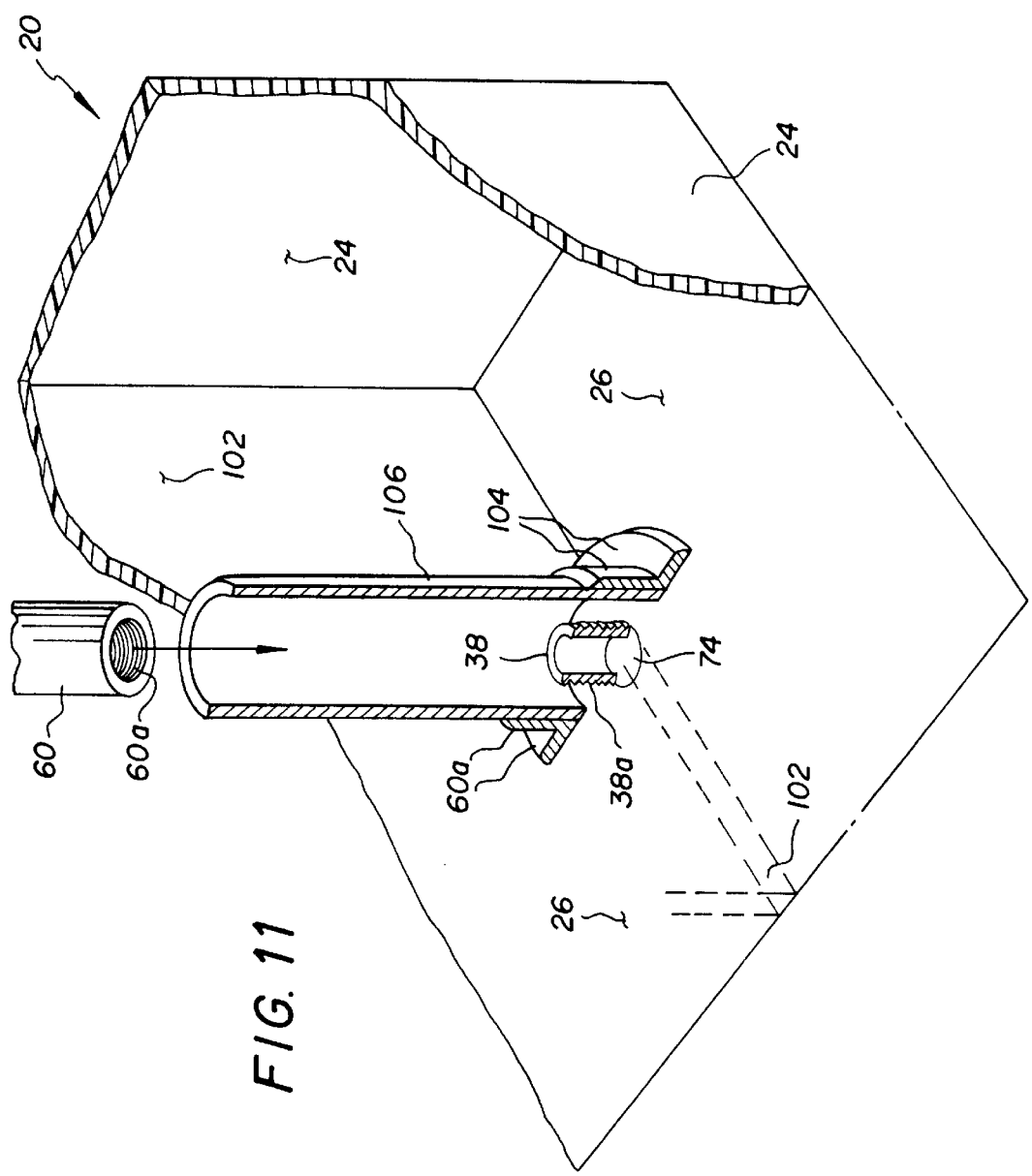
FIG. 11 is a cross-sectional side view of the middle part of the food container showing details of the mast securing fitting and how the mast retaining tube and mast are secured to the mast securing fitting.

The second embodiment is like the first, with the following exceptions. Once again, the pointer 72 is secured to the mast 42 lower end. The port closing door 80 is eliminated. See FIG. 11. A tubular nipple fitting 38 having external threads 38a and a smooth interior is fastened to container bottom wall 26 encircling pointer passing port 74. An annular tube container mounting flange 104 is fastened to container bottom wall 26 encircling and radially spaced outwardly from tubular nipple fitting 38, and a hollow tube chamber 106 is secured to the mounting flange 104 such as with a suitable adhesive and extends upwardly into the top wall mast passing port 32, where the hollow tube chamber 106 terminates to become flush with the container top wall 22 upper surface. A retaining tube 60 having a retaining tube 60 lower which contains retaining tube internal threads 60a fits downwardly through hollow tube chamber 106 and screws onto tubular nipple fitting external threads 38a, fitting between tubular nipple fitting 38 and hollow tube chamber 106. Retaining tube 60 is of sufficient length that it extends upwardly through mast passing port 32 several inches. A thumb set screw 82 is screwed through a threaded opening in retaining tube 60. The pointer 72 and mast 42 lower end are removably fitted downwardly through retaining tube 60 so that pointer 72 protrudes a desired distance out of the container bottom wall 26, and then thumb set screw 82 is rotated by hand to abut and releasibly engage mast 42 against further movement within retaining tube 60. Retaining tube 60 extends several inches above the thumb set screw 82 to receive and mount an adjustable table structure 110 described in the paragraphs which follow.

The first and second embodiments each may include a partition wall 102 within container 20 dividing the interior of container 20 into two regions which can be independently accessed from a corresponding one of the two container lids 28a and 28b. See FIG. 11. In this way, partition wall 102 segregates food items or keeps one region cool while the other region is open. The mast 42 or hollow tube chamber 60 pass through a slot in or are integral with the partition wall 102.

Figure 9:
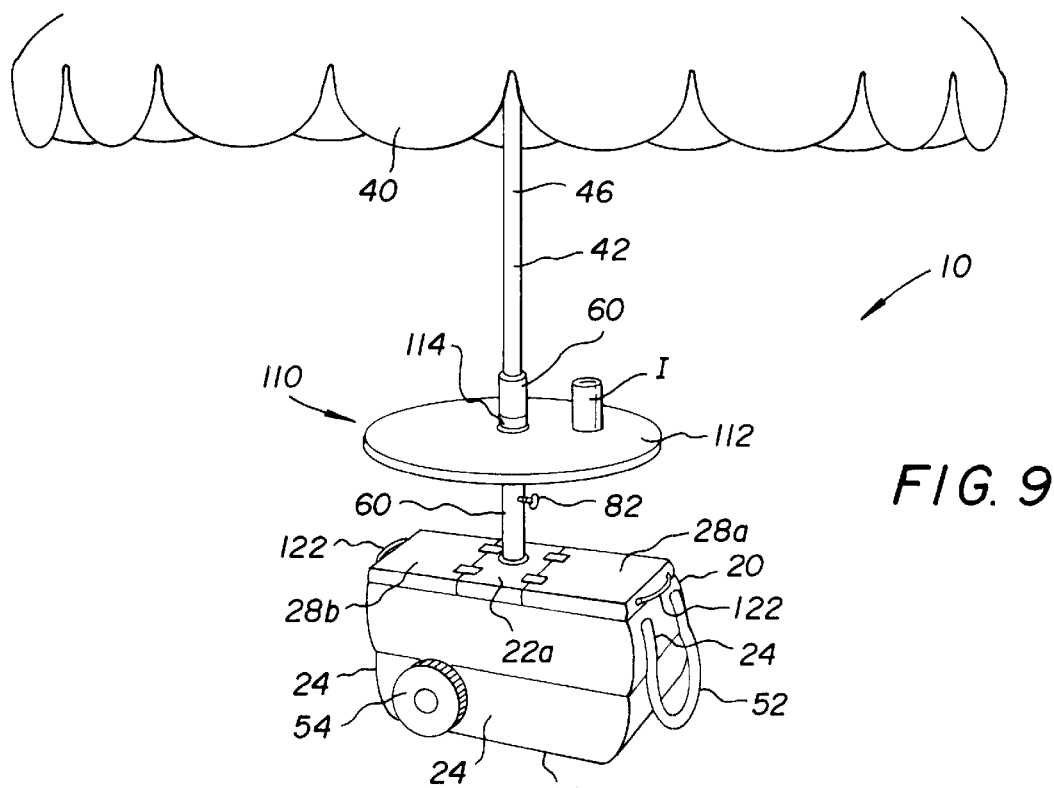
FIG. 9 is a perspective side view of the second embodiment of the apparatus having the optional adjustable table structure.
Figure 10:
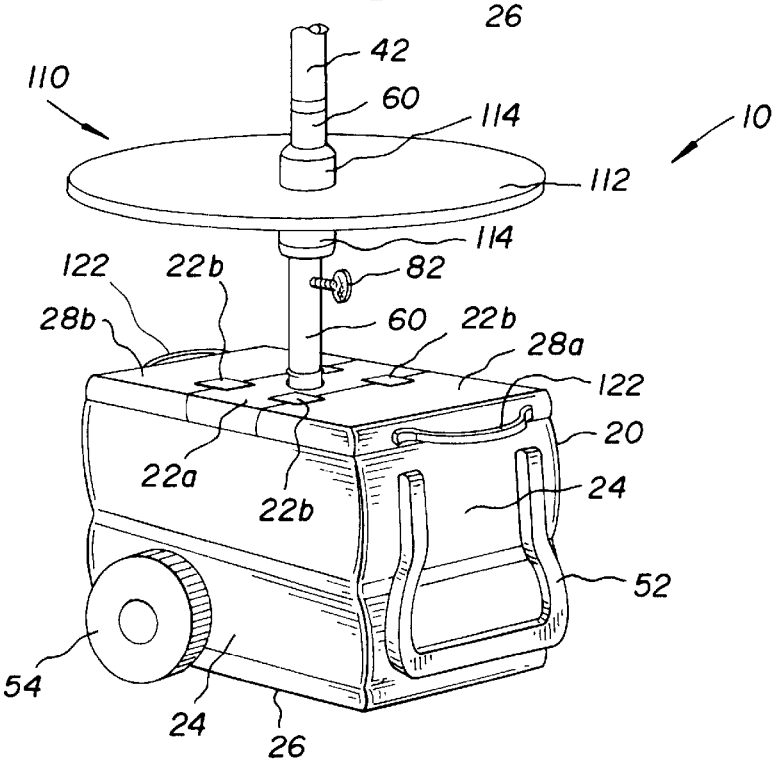
FIG. 10 is a close-up of the apparatus of FIG. 9 with the umbrella mast broken away.

The first and second embodiments also may each include an adjustable table structure 110 which takes the form of a table panel 112 having a mast passing table port and mast engaging table structure support means 114. See FIGS. 9 and 10. Table panel 112 encircles mast 42 above container 20 and may have any desired perimeter shape, including but not limited to circular, square, rectangular, hexagonal or octagonal. The mast engaging table structure support means 114 preferably includes what are known in the plumbing field as compression fittings 114 which encircle and are slidable along the mast 42 or the mast retaining tube 60 and which have external tubular portions which are rotated axially about the mast 42 in one direction to grip the mast 42 and rotated about the mast 42 in the other direction to release the mast 42. Thus table panel 112 and a compression fitting 114 below table panel 112 are slid upwardly or downwardly along mast 42 or tube 60 to the desired height for table structure 110, and then the compression fitting 114 is operated to engage the mast 42 and thereby support table panel 112 at the selected elevation. A second compression fitting 114 is preferably provided above table panel 112 for bearing downwardly on the fixed table panel 112 and then operated to engage the mast 42.

For either embodiment, the container 20 may have any of several lateral perimeter shapes, including but not limited to square, rectangular, circular, hexagonal, octagonal or triangular. Lid gripping handles 122 are optionally provided.

Third Preferred Embodiment

Figure 12:
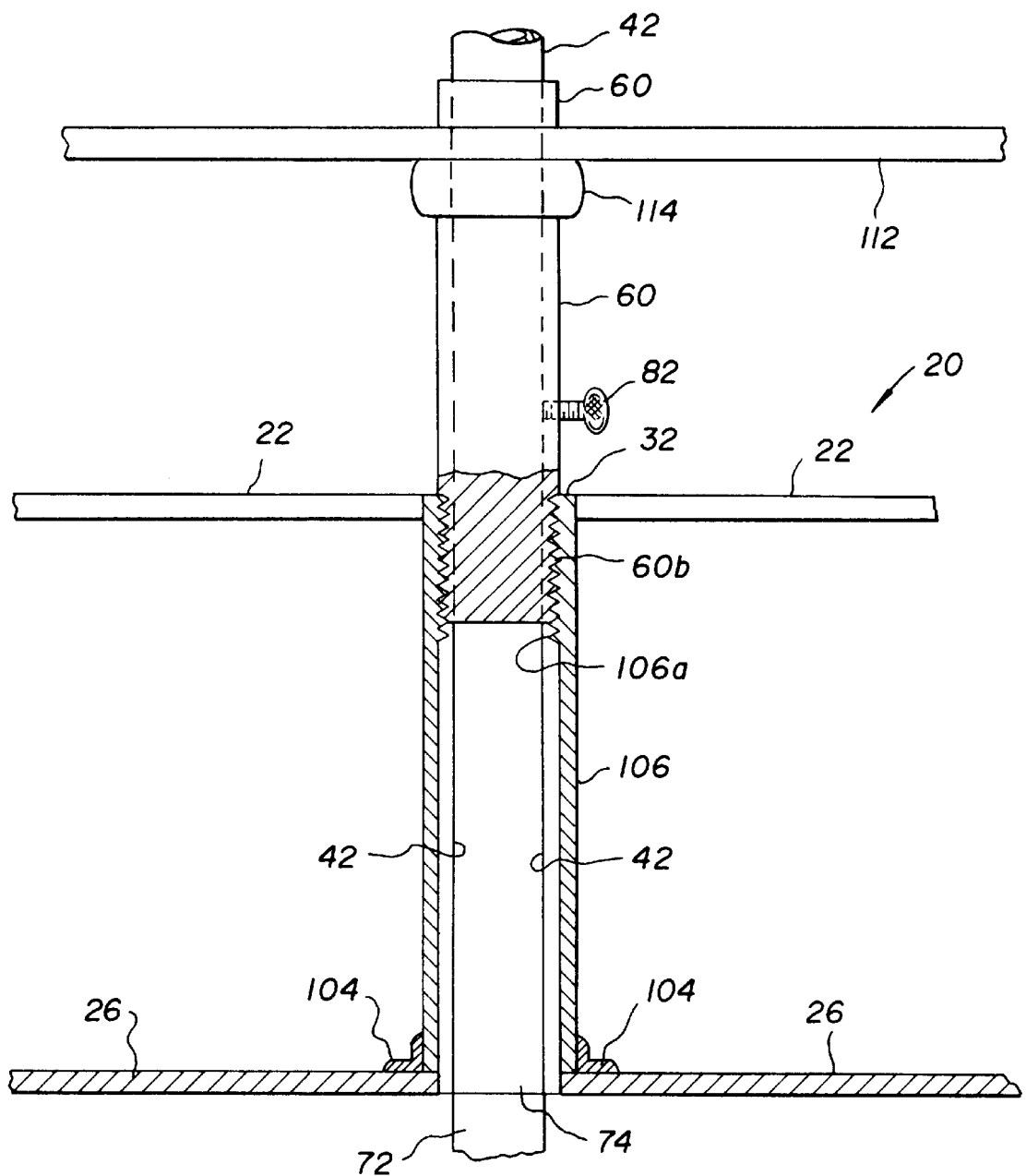
FIG. 12 is a third embodiment.

A third embodiment is provided which is similar to the first two embodiments except that the upper end of hollow tube chamber 106 contains tube chamber internal threads 106a and the lower end of retaining tube 60 has retaining tube external threads 60b and is sized to screw into hollow tube chamber 106. See FIG. 12. Thumb set screw 82 once again is provided a few inches above container top wall 22 for engaging the mast 42, which passes downwardly through retaining tube 60 and through hollow tube chamber 106 so that pointer 72 passes through pointer passing port 74. Once again retaining tube 60 extends several inches above thumb set screw 82 to mount adjustable table structure 110.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A container apparatus for use in combination with an umbrella having an umbrella mast and umbrella canopy, comprising:

A food container having a container top wall, a container side wall and a container bottom wall together defining a container interior, with an umbrella mast passing port, mast engaging means, and a container interior access door;

Such that the umbrella mast may be inserted into said mast passing port and advanced into the interior of said container and engaged by said mast engaging means, thereby holding said umbrella mast upright relative to said container and such that said container stabilizes the umbrella, which can be opened over said container;

Container stabilizing means including a pointer passing port for keeping said umbrella from overbalancing said container and causing said container to tip over when said apparatus rests on a granular support surface;

A tubular nipple fitting having external threads fastened to said container bottom wall encircling said pointer passing port;

An annular tube container mounting flange fastened to said container bottom wall encircling and radially spaced outwardly from said tubular nipple fitting;

A hollow tube chamber secured to said mounting flange and extending upwardly into the top wall mast passing port;

And a retaining tube having a retaining tube lower end containing retaining tube internal threads and fitting downwardly through said hollow tube chamber and screwing onto said tubular nipple fitting external threads, fitting between said tubular nipple fitting external threads, fitting between said tubular nipple fitting and said hollow tube chamber;

Wherein said retaining tube is of sufficient length that it extends upwardly through said mastpasing port a certain distance.

2. The container of claim 1 wherein said umbrella mast comprises:

a mast upper segment;

and a mast lower segment separate from said mast upper segment, said mast lower segment being tubular and sized such that said mast upper segment telescopically fits into said mast lower segment to produce any of a variety of overall mast heights as desired by the individual user; a cam lever locking mechanism for releasably locking said mast upper segment against movement relative to said mast lower segment at the desired telescoping position.

3. The apparatus of claim 2 wherein the upper end of said mast lower segment comprises a cam lever opening and wherein said cam lever locking mechanism comprises:

a cam lever having an elongate lever end for gripping and moving by hand and having a cam end perforated by a fulcrum pin port and which fits into said cam lever opening in said mast lower segment and comprises a cam lever pin passing through said mast lower segment upper end, through said cam lever opening and through said fulcrum pin port in said cam lever, such that said cam lever pivots within said cam lever opening and said cam end progressively protrudes into the interior of said mast lower segment to varying degrees as said cam lever is pivoted and thus progressively bears against and grips said mast upper segment.

4. The apparatus of claim 1 wherein said container is insulated against heat transfer between the container interior and the surrounding environment.

5. The apparatus of claim 1 wherein said container top wall is substantially horizontal when said container is upright and thereby functions as a table upon which a user can place food and drink items.

6. The apparatus of claim 1 wherein a pull handle is on said container and at least one wheel rotatably mounted onto said container substantially opposite said pull handle such that said container wheel rolls on the ground as the pull handle is pulled by a user.

7. The apparatus of claim 1 wherein said apparatus additionally has container stabilizing means for keeping the umbrella from overbalancing said container and causing said container to tip over when said apparatus rests on a granular support surface.

8. The apparatus of claim 7 wherein said stabilizing means comprises:

a pointer removably secured to the lower end of said umbrella mast;

and a pointer passing port in said container bottom wall for passing said pointer completely through said container such that said pointer projects downwardly out of said container bottom wall and into said granular support surface.

9. The apparatus of claim 8 wherein a depth marking line is on said mast for indicating a suggested pointer insertion depth when said depth marking line registers with another part of said apparatus.

10. The apparatus of claim 8 wherein said pointer comprises a shaft having substantially the same diameter as the umbrella mast and has a pointer lower end which is tapered for lower resistance penetration into the ground.

11. The apparatus of claim 8 wherein said pointer has a pointer upper end, and said pointer upper end has an upwardly protruding, axial, externally threaded pointer bolt portion having a smaller diameter than the diameter of the umbrella mast;

And wherein the mast lower end has an internally threaded axial mast bore for threadedly receiving said pointer bold portion to removably connect said pointer to said umbrella mast.

12. The apparatus of claim 8 wherein said pointer is integral with said umbrella mast.

13. The apparatus of claim 8 wherein said pointer is removably secured to said umbrella mast.

14. The apparatus of claim 8 wherein said pointer has a penetrating pointer lower end;

and an engaging pointer upper end removably secured to said upper end.

15. The apparatus of claim 1 wherein said container additionally comprises at least one container partition wall dividing the interior of said container into at least two interior regions.

16. The apparatus of claim 15 wherein said apparatus additionally comprises:

an adjustable table structure having a central table structure port through which said mast passes;

and releasable mast engaging means.

* * * * *